United States Patent
Böshagen et al.

[11] 3,914,242
[45] Oct. 21, 1975

[54] 3-IMINO-1,2-BENZISOTHIAZOLINES

[75] Inventors: Horst Böshagen, Haan, Rheinland; Walter Geiger; Hans Medenwald, both of Wuppertal-Elberfeld, Germany

[73] Assignee: Bayer Aktiengesellschaft, Germany

[22] Filed: Dec. 16, 1968

[21] Appl. No.: 784,249

[30] Foreign Application Priority Data
Dec. 27, 1968  Germany............................ 1670967

[52] U.S. Cl.................................. 260/304; 424/270
[51] Int. Cl.².......................................... C07D 275/04
[58] Field of Search..................................... 260/304

[56] References Cited
FOREIGN PATENTS OR APPLICATIONS
6,610,677  1/1967  Netherlands........................ 260/304

OTHER PUBLICATIONS
Chapman et al., J. Chem. Soc., 1932, 1770–1775.
Sidgwick, The Organic Chemistry of Nitrogen, Oxford, Clarendon Press, p. 156 (1937).
Boshagen, Berichte, 99 (8), 2566–2571 (1966).
Stolle, Chem. Abstracts, 20:763 (1926).

Primary Examiner—Richard J. Gallagher

[57] ABSTRACT
3-imino-1,2-benzisothiazolines of the formula:

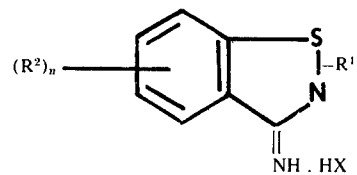

wherein:

$R^1$ is aliphatic of 1 to 8 carbon atoms, araliphatic of 1 to 4 carbon atoms in the aliphatic moiety, aryl of 1 to 10 carbon atoms, aliphatic of 1 to 8 carbon atoms substituted by halogen, nitro, lower alkoxy or dialkylamino, cycloaliphatic of 5 to 7 carbon atoms substituted by halogen, nitro, lower alkyl, lower alkoxy or dialkylamino, araliphatic of 1 to 4 carbon atoms in the aliphatic moiety, substituted by halogen, nitro, lower alkyl, lower alkoxy or dialkylamino, or aryl of 1 to 10 carbon atoms substituted by halogen, nitro, lower alkyl, lower alkoxy or dialkylamino, $R^2$ is the same as $R^1$ or is the same or different hydrogen, halogen, lower alkyl, lower alkoxy, alkylmercapto or nitro, provided however only one $R^2$ can be nitro, HX is a strong organic or inorganic acid, and n is an integer from 1–3, are produced by heating the corresponding amino salt, removing unchanged starting material and recovering the 3-imino-1,2-benzisothiazolines produced. These compounds are useful for their antimycotic activity. They are administered in the same general dosage range as known antimycotics.

7 Claims, No Drawings

3-IMINO-1,2-BENZISOTHIAZOLINES

The present invention is concerned with 3-imino-1,2-benzisothiazolines and their production. More particularly, the present invention is concerned with 3-imino-1,2-benzisothiazolines which are substituted in the 2-position and which may be represented by the formula:

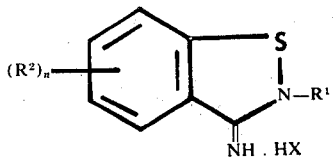

wherein:
$R^1$ is aliphatic of 1 to 8 carbon atoms, araliphatic of 1 to 4 carbon atoms in the aliphatic moiety, aryl of 1 to 10 carbon atoms, aliphatic of 1 to 8 carbon atoms substituted by halogen, nitro, lower alkoxy or dialkylamino, cycloaliphatic of 5 to 7 carbon atoms substituted by halogen, nitro, lower alkyl, lower alkoxy or dialkylamino, araliphatic of 1 to 4 carbon atoms in the aliphatic moiety, substituted by halogen, nitro, lower alkyl, lower alkoxy or dialkylamino, or aryl of 1 to 10 carbon atoms substituted by halogen, nitro, lower alkyl, lower alkoxy or dialkylamino, $R^2$ is the same as $R^1$ or is the same or different hydrogen, halogen, lower alkyl, lower alkoxy, alkylmercapto or nitro, provided however only one $R^2$ can be nitro, HX is a strong organic or inorganic acid, and
$n$ is an integer from 1-3.

It is known in the art to produce substituted 3-amino-1,2-benzisothiazoles from the reaction of 3-chloro-1,2-benzisothiazoline chlorides with ammonia. See Chemische Berichte 99, 2566 (1966).

It has now been found that 3-imino-1,2-benzisothiazolines substituted in the 2-position can be obtained by heating optionally in the presence of water or a suitable organic solvent, a compound of the formula:

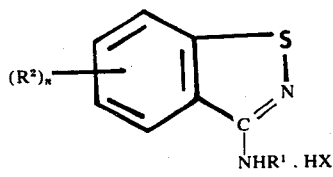

wherein:
$R^1$ is aliphatic of 1 to 8 carbon atoms, araliphatic of 1 to 4 carbon atoms in the aliphatic moiety, aryl of 1 to 10 carbon atoms, aliphatic of 1 to 8 carbon atoms substituted by halogen, nitro, lower alkoxy or dialkylamino, cycloaliphatic of 5 to 7 carbon atoms substituted by halogen, nitro, lower alkyl, lower alkoxy or dialkylamino, araliphatic of 1 to 4 carbon atoms in the aliphatic moiety, substituted by halogen, nitro, lower alkyl, lower alkoxy or dialkylamino, or aryl of 1 to 10 carbon atoms substituted by halogen, nitro, lower alkyl, lower alkoxy or dialkylamino, $R^2$ is the same as $R^1$ or is the same or different hydrogen, halogen, lower alkyl, lower alkoxy, alkylmercapto or nitro, provided however only one $R^2$ can be nitro, HX is a strong organic or inorganic acid, and
$n$ is an integer from 1-3, removing unchanged starting material, such as by nitrosation in an acidic solution or by physical separation techniques and thereafter recovering the resultant 3-imino-1,2-benzisothiazolines of the formula:

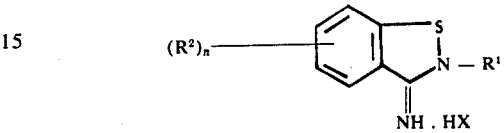

wherein $R^1$, $R^2$, HX and $n$ are as defined above.

According to preferred embodiments of the present invention, the aliphatic moieties are straight or branched chain groups of 1 to 4 carbon atoms which may be substituted by halogen atoms, particularly fluorine, chlorine or bromine, a nitro group, lower alkoxy or a dialkylamino group. These aliphatic moieties may contain a double or triple bond.

The preferred cycloaliphatic moieties are those having 6 carbon atoms in the ring system and these may be substituted by halogen atoms, particularly fluorine, chlorine or bromine, nitro, lower alkoxy, dialkylamino or by an alkyl group.

The aryl aliphatic moieties are preferably arylalkyl groups of 1 to 4 carbon atoms and preferably 1 to 2 carbon atoms and the preferred aryl moiety if phenyl. The aralkyl moieties may be substituted by halogen, particularly fluorine, chlorine or bromine, nitro, lower alkoxy, dialkylamino or by an alkyl group.

The preferred aryl moiety is phenyl and the phenyl moiety may be substituted by halogen, preferably fluorine, chlorine or bromine, nitro, lower alkoxy, dialkylamino or an alkyl group.

When $R^2$ is an alkyl moiety, it is preferred that the alkyl moiety is of 1 to 4 carbon atoms.

The preferred strong inorganic or organic acids, i.e., HX, are halogen hydracids, the various phosphoric acids, nitric acids and sulfuric acids, as well as the sulfonic acids of benzene, toluene and naphthalene. Hydrochloric and hydrobromic acids are particularly preferred.

The reaction mechanism involved can be represented by the following reaction scheme which shows an equilibrium between the amino and imino salts:

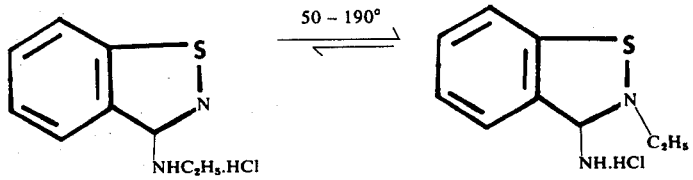

The process of the present invention can also be carried out in the melt without the use of a solvent. It is advantageous to avoid any substantial exceeding of the melting temperature. According to the preferred embodiment of the process of the present invention, the heating which results in isomerization, is carried out in the presence of an inert organic solvent and a particularly suitable solvent is water which, of course, is readily available. In addition to water, advantageous solvents include the lower alcohols, particularly methanol and ethanol, ketones, such as acetone and strongly polar solvents, such as dimethylsulfoxide (DMSO). These solvents may also be used in admixture with water. When carrying out the process in the presence of a solvent, it is generally advantageous to use the starting material at a concentration which does not exceed 0.5 mols per liter.

The process according to the present invention is preferably carried out in a temperature range of from about 40°C to about 100°C and the range of from about 50°C to about 80°C is particularly advantageous.

In the process according to the present invention as indicated above, the N-substituted 3-amino-1,2-benzisothiazoles are rearranged into the isomeric 3-imino-1,2-benzisothiazolines substituted in the 2-position under temperature conditions which are as gentle as possible. The resulting reaction mixture always contains some unchanged starting material as is clear from fact that an equilibrium is set up. To recover the 3-imino-1,2-benzisothiazolines produced, it is preferred to remove the starting material by a suitable technique, such as nitrosation, in an acidic solution or by a physical-chemical method. When nitrosation is used, the reaction mixture is treated, if necessary, after removing any organic solvent which may have been used, with dilute ageous acid, preferably hydrochloric acid, and subsequently with at least twice the molar quantity of a nitrosation agent, such as sodium nitrite, isoamyl nitrite or ethyl nitrite, preferably at room temperature, and the nitrosated starting material is then removed from the reaction mixture by shaking or extracting with an organic solvent, preferably ether or benzene, and the remaining 3-imino-1,2-benzisothiazoline produced is isolated from the remaining aqueous phase and recovered.

In the case of a physical-chemical method of removal of the starting material, the reaction mixture is preferably obtained in dry form with chloroform after removing any water or solvent. In this manner, the unchanged starting material remains behind undissolved.

The 3-imino-1,2-benzisothiazoline derivatives obtained according to the present invention are colorless crystalline compounds which are distinguished from the isomeric N-substituted 3-amino-1,2-benzisothiazoles by IR and NMR spectra. In addition, they exhibit different melting points and some of them are more readily soluble as shown by different migration values in paper chromotography and high voltage paper electrophoreses.

The compounds of the present invention exhibit antimycotic activity and this antimycotic activity is essentially the same as that exhibited by the compounds of British Patent No. 1,088,550. The compounds of the present invention may be administered in the same general dosage ranges as known antimycotic agents and are preferably administered in solution form.

The compounds of the present invention are also useful as intermediates for the production of plant protection agents and those skilled in the art will readily appreciate how to produce the final plant protection compounds. The compounds of the present invention may also be used as plant protection agents per se.

The following non-limitative examples more clearly illustrate the present invention:

EXAMPLE 1

214.7 g (1.0 mol) of 3-ethylamino-1,2-benzisothiazolehydrochloride are suspended in 2.5 l of water and the mixture is heated to 50°C while stirring for about 24 hours. A clear solution results which is evaporated to dryness in a rotary evaporator (water jet vacuum, bath temperature about 35°C).

21.5 g (0.1 mol) of the isomeric mixture thus obtained are dissolved in 215 ml of a 5% hydrochloric acid in the heat, cooled to 25°C and 29.3 g (0.25 mol) of isoamylnitrite are added. The mixture is shaken for 10 minutes and subsequently extracted twice with ether. The aqueous phase separated off is evaporated to dryness in a rotary evaporator (water jet vacuum, bath temperature about 30°C). The residue crystallizes after grinding with little chloroform. The crystals are filtered off with suction and dried to constant weight in a vacuum at room temperature.

Yield: 13.8 g of 2-ethyl-3-imino-1,2-benzisothiazoline hydrochloride; colorless crystals of the melting point 169°C.

NMR-spectrum: referred to 2,2'-dimethylsilapentane-5-sulfonate = 10 ppm; solvent $D_2O$; concentration 10%.

methylene: quartet 6.02 ppm; methyl: triplet 8.41 ppm. IR-spectrum (KBr-molding): most intensive bands, 3050 (broad), 1655, 1588, 1445, 778, 732.

EXAMPLE 2

When using 3-methylamino-1,2-benzisothiazolehydrochloride, there is obtained 2-methyl-3-imino-1,2-benzisothiazolinehydrochloride in a manner analogous to that described in Example 1.

Yield: 60% of the theory, colorless crystals of the melting point 232°C (decomposition).

IR-spectrum (KBr-molding): most intensive bands, 3240 (broad), 3080 (broad), 1655, 1594, 774, 736.

NMR-spectrum: referred to 2,2'-dimethyl-silapentane-5-sulfonate = 10 ppm; solvent $D_2O$; concentration 10% methyl: 6.55 ppm. (singulette)

EXAMPLE 3

2-(2'-chloroethyl)-3-imino-1,2-benzisothiazolinehydrochloride is obtained from 3-(2'-chloroethyl)-amino-1,2-benzisothiazole-hydrochloride in a manner analogous to that described in Example 1. Colorless crystals, melting point 165°–166°C (decomposition).

IR-spectrum (KBr molding): most intensive bands, 3000, 1660, 1594, 779, 740.

NMR-spectrum: referred to tetramethylsilane = 10 ppm.

Solvent: 95 parts of $CD_3OD$/5 parts of 20% DCl.
—N—$CH_2$ = 5.39 ppm (triplet). —$CH_2$.Cl = 5.92 ppm (triplet).

What is claimed is:

1. An iminobenzisothiazoline of the formula:

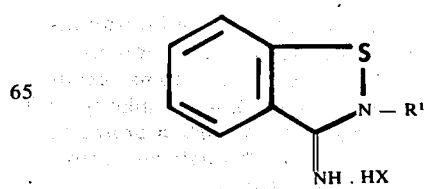

wherein:
R¹ is alkyl of 1 to 4 carbon atoms unsubstituted or substituted by fluorine, chlorine or bromine, phenyl unsubstituted or substituted by fluorine, chlorine or bromine or cyclohexyl and
HX is a strong organic or inorganic acid 2. A compound according to claim 1 wherein HX is hydrochloric acid or hydrobromic acid 3. A compound according to claim 1 wherein R¹ is alkyl of 1 to 4 carbon atoms unsubstituted or substituted by fluorine, chlorine or bromine 4. A compound according to claim 1 wherein R¹ is alkyl of 1 to 4 carbon atoms or chloroalkyl of 1 to 4 carbon atoms.

5. 2-ethyl-3-imino-1,2-benzisothiazoline · hydrochloride.

6. 2-methyl-3-imino-1,2-benzisothiazoline · hydrochloride.

7. 2-(2'-chloroethyl)-3-imino-1,2-benzisothiazoline · hydrochloride.

* * * * *

UNITED STATES PATENT AND TRADEMARK OFFICE
CERTIFICATE OF CORRECTION

PATENT NO. : 3,914,242
DATED : December 16, 1968
INVENTOR(S) : HORST BUSHAGEN ET AL It is certified that error appears in the above-identified patent and that said Letters Patent are hereby corrected as shown below:

Correct the priority date to read --December 27, 1967--.

In the abstract, column 2, the formula should be:

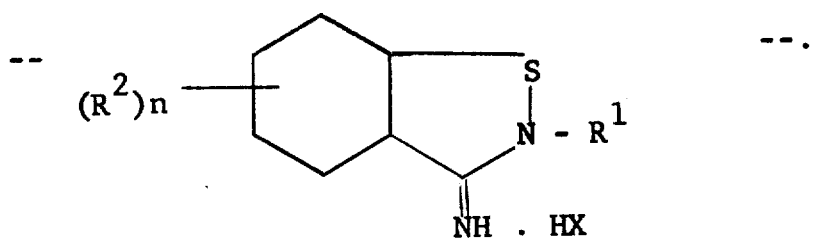

Signed and Sealed this third Day of February 1976

[SEAL]

Attest:

RUTH C. MASON
Attesting Officer

C. MARSHALL DANN
Commissioner of Patents and Trademarks